US009836124B2

(12) United States Patent
Nahman et al.

(10) Patent No.: US 9,836,124 B2
(45) Date of Patent: Dec. 5, 2017

(54) TECHNIQUES FOR DYNAMICALLY CHANGING TACTILE SURFACES OF A HAPTIC CONTROLLER TO CONVEY INTERACTIVE SYSTEM INFORMATION

(71) Applicant: HARMAN INTERNATIONAL INDUSTRIES, INC., Stamford, CT (US)

(72) Inventors: Jaime Elliot Nahman, Oakland, CA (US); Stefan Marti, Oakland, CA (US); Davide Di Censo, Oakland, CA (US); Mirjana Spasojevic, Palo Alto, CA (US)

(73) Assignee: HARMAN INTERNATIONAL INDUSTRIES, INCORPORATED, Stamford, CT (US)

( * ) Notice: Subject to any disclaimer, the term of this patent is extended or adjusted under 35 U.S.C. 154(b) by 0 days.

(21) Appl. No.: 14/747,444

(22) Filed: Jun. 23, 2015

(65) Prior Publication Data

US 2016/0187979 A1    Jun. 30, 2016

Related U.S. Application Data

(60) Provisional application No. 62/098,790, filed on Dec. 31, 2014.

(51) Int. Cl.
 *G09G 5/00* (2006.01)
 *G06F 3/01* (2006.01)
 *G06F 3/0488* (2013.01)

(52) U.S. Cl.
 CPC .............. *G06F 3/016* (2013.01); *G06F 3/017* (2013.01); *G06F 3/0488* (2013.01); *G06F 2203/014* (2013.01); *G06F 2203/04809* (2013.01)

(58) Field of Classification Search
 CPC ............... G06F 3/0412; G06F 3/04817; G06F 3/04842; G06F 3/04883; G06F 3/0482; G06F 3/04847; G06F 3/017; G06F 3/016
 (Continued)

(56) References Cited

U.S. PATENT DOCUMENTS

| 8,400,410 B2 | 3/2013 | Taylor et al. |
| 2009/0128503 A1 | 5/2009 | Grant et al. |

(Continued)

FOREIGN PATENT DOCUMENTS

EP    2733573 A1    5/2014

OTHER PUBLICATIONS

Non-Final Office Action for U.S. Appl. No. 14/815,766 dated Dec. 2, 2016.

(Continued)

*Primary Examiner* — Jennifer Nguyen
(74) *Attorney, Agent, or Firm* — Artegis Law Group, LLP

(57) ABSTRACT

In one embodiment of the present invention, a haptic engine dynamically configures a haptic controller to provide information regarding the state of an interactive system via sensations of texture. In operation, as the state of the interactive system changes, the haptic engine dynamically updates a haptic state that includes texture characteristics, such as texture patterns, that are designed to reflect the state of the interactive system in an intuitive fashion. The haptic engine then generates signals that configure touch surfaces included in the haptic controller to convey these texture characteristics. Advantageously, providing information regarding the correct state and/or operation of the interactive system based on sensations of texture reduces distractions attributable to many conventional audio and/or visual interactive systems. Notably, in-vehicle infotainment systems that provide dynamically updated texture data increase driv- (Continued)

ing safety compared to conventional in-vehicle infotainment systems that often induce drivers to take their eyes off the road.

22 Claims, 9 Drawing Sheets

(58) Field of Classification Search
USPC .................................................. 345/173–178
See application file for complete search history.

(56) References Cited

U.S. PATENT DOCUMENTS

| | | | | |
|---|---|---|---|---|
| 2013/0016042 | A1* | 1/2013 | Makinen | G06F 3/016 345/168 |
| 2014/0118127 | A1* | 5/2014 | Levesque | G06F 3/016 340/407.2 |
| 2015/0309573 | A1* | 10/2015 | Brombach | B60K 37/02 715/702 |
| 2016/0124510 | A1* | 5/2016 | Hyde | G06F 3/016 340/407.2 |

OTHER PUBLICATIONS

Wikipedia Article, Actuator, printed Nov. 2016.
Stanley et al., "Controllable Surface Haptics via Particle Jamming and Pneumatics," IEEE Transactions, 2014.
Tactus Technology White Paper "Taking Touch Screen Interfaces Into a New Dimension" Copyright © 2012 Tactus Technology, Inc. (http://tactustechnology.com/wp-content/uploads/2013/09/Tactus_Technology_White_Paper.pdf).
Biet, M., Giraud, F. and Lemaire-Semail, B. (2008) 'Implementation of tactile feedback by modifying the perceived friction', The European Physical Journal—Applied Physics, 43(1), pp. 123-135. (http://journals.cambridge.org/action/displayAbstract?fromPage=online&aid=8023980).
Raffle, et al. "Super Cilia Skin: An Interactive Membrane" CHI 2003, Apr. 5-10, 2003, Ft. Lauderdale, Florida, USA. ACM 1-58113-630-7/03/0004. (http://www.hayesraffle.com/projects/super-cilia-skin).
Bau, et al. "TeslaTouch: Electrovibration for Touch Surfaces" UIST'10, Oct. 3-6, 2010, New York, New York, USA. Copyright 2010 ACM 978-1-4503-0271-5/10/10(http://www.disneyresearch.com/project/teslatouch/).
Iliaifar, Amir "Magna Intelligent Surface Technology: Like Controlling Your Car with an iPhone" DigitalTrends.com, May 17, 2012. (http://www.digitaltrends.com/cars/magna-intelligent-surface-technology-like-controlling-your-car-with-an-iphone/).
Coxworth, Ben "Magnetic microhair material can change transparency, and make water flow uphill" NewAtlas.com Aug. 8, 2014. (http://newatlas.com/magnetic-microhair-material/33291/).
Yoo, et al. "PneUI: Pneumatically Actuated Soft Composite Materials for Shape Changing Interfaces" UIST'13, Oct. 8-11, 2013, St. Andrews, United Kingdom. Copyright © 2013 ACM 978-1-4503-2268-3/13/10. (http://tmg-trackr.media.mit.edu/publishedmedia/Papers/528-PneUI%20Pneumatically%20Actuated%20Soft/Published/PDF).
Pflug, Enno, Continental Press Portal "Study: Next Generation Touchpad with Haptic Feedback Makes Control Tasks Easier and Safer" Nov. 8, 2013 (http://www.continental-corporation.com/www/servlet/pdf/9280786/pr_2013_11_08_touchpad_en.pdf).
Extended European Search Report Application No. 15202571.4, dated May 13, 2016, 7 pages.

* cited by examiner

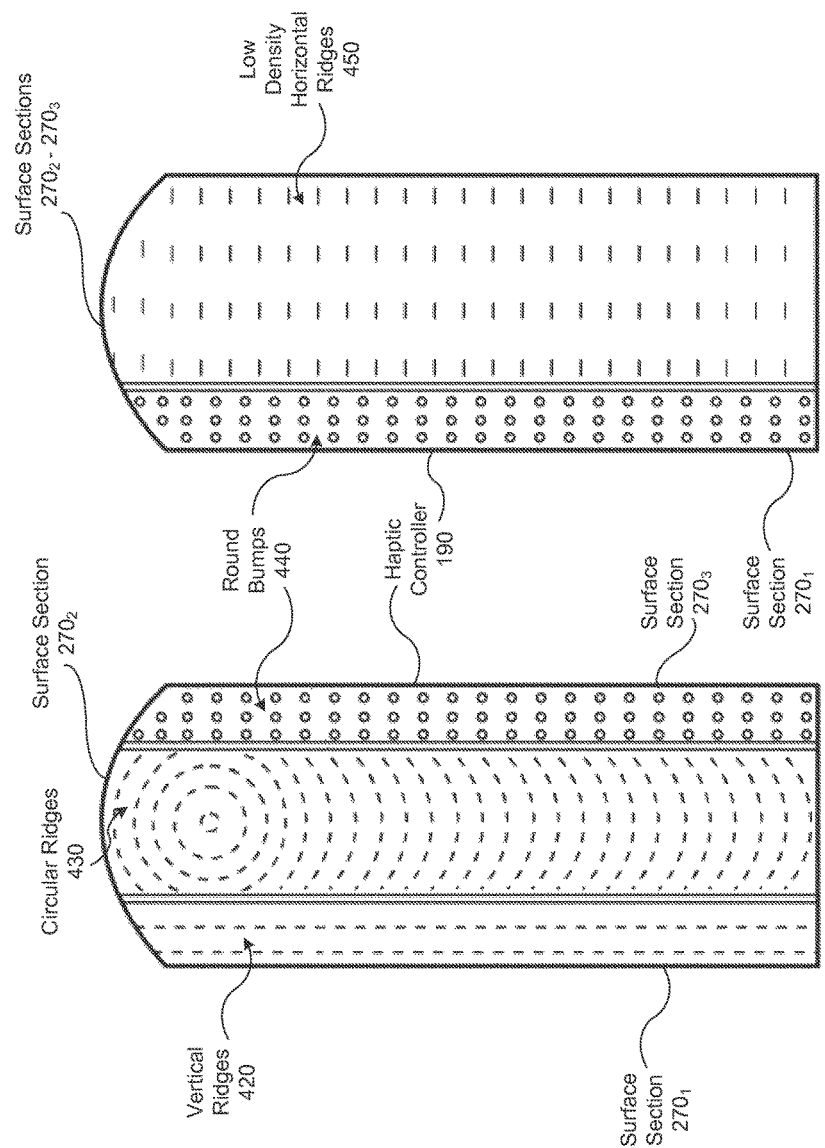

TECHNIQUES FOR DYNAMICALLY CHANGING TACTILE SURFACES OF A HAPTIC CONTROLLER TO CONVEY INTERACTIVE SYSTEM INFORMATION

CROSS-REFERENCE TO RELATED APPLICATIONS

This application claims benefit of the U.S. Provisional Patent Application having Ser. No. 62/098,790 and filed on Dec. 31, 2014. The subject matter of this related application is hereby incorporated herein by reference.

BACKGROUND

Field of the Invention

Embodiments of the present invention relate generally to automotive design and, more specifically, to techniques for dynamically changing tactile surfaces of a haptic controller to convey interactive system information.

Description of the Related Art

Interactive systems typically include one or more interface mechanisms that enable users to dynamically control and/or observe the state of the interactive system. For example, a computer system may include multiple interface mechanisms such as a mouse, a keyboard, and a display device. Ideally, these interface mechanisms enable the user to efficiently control the operations of the interactive system in an intuitive manner and with minimal cognitive load (i.e., amount of mental effort). However, in some situations, manipulating such interactive mechanisms may unacceptably increase the cognitive load of the user. For example, the aggregate cognitive load required for a user to perform several "secondary" interactive tasks in parallel may cause the user to lose focus on the "primary" task.

One common primary task where users are particularly susceptible to distraction attributable to secondary interactive tasks is driving. For example, an in-vehicle infotainment system may include a central control panel that enables the user to enter commands that alter the state of the system and receive feedback regarding the current state and target state of the system. In operation, the user may glance at a touch-sensitive display embedded in the central control panel to determine that the current mode is "navigation," perform a forward swipe gesture to change the mode to "media," glance at the display to determine the actions that are available in the media mode, and then perform an additional swipe gesture to play a particular song. When the user performs such adjustments while driving, the user typically takes his/her eyes off the road—multiple times—reducing the ability of the driver to focus on driving, which increases the likelihood of accidents.

In an effort to reduce driver distraction attributable to visual interfaces, some in-vehicle infotainment systems have been designed to include, among things, auditory interfaces. Nonetheless, such systems still provide visual feedback to the user to convey the current operational mode (i.e., navigation, media, etc.), different actions that can be performed in the current operational mode, and/or the results of various user-based actions. Visual feedback of this nature is still distracting to users. Further, auditory interfaces are susceptible to errors introduced by road noise, passenger conversations, etc. Those errors further distract users when they occur. Consequently, the increased cognitive load attributable to operating in-vehicle infotainment systems that include auditory interfaces is still relatively high.

As the foregoing illustrates, more effective techniques for users to interface with interactive systems would be useful.

SUMMARY

One embodiment of the present invention sets forth a computer-implemented method for conveying information related to one or more states associated with an interactive system. The method includes determining a first texture characteristic based on a first state associated with the interactive system, transmitting a first haptic control signal to a haptic controller that causes the haptic controller to configure a first surface to provide a first tactile sensation corresponding to the first texture characteristic, determining a second texture characteristic based on a second state associated with the interactive system, and transmitting a second haptic control signal to the haptic controller that causes the haptic controller to configure the first surface to provide a second tactile sensation corresponding to the second texture characteristic.

Further embodiments provide, among other things, a subsystem and a non-transitory computer-readable medium configured to implement the method set forth above.

At least one advantage of the disclosed techniques is that they enable users to interact with systems in a non-visual, non-auditory manner. As a result, users may engage in secondary interactive tasks while maintaining appropriate focus on a primary task that relies heavily on the sense of sight and/or sound. Notably, these techniques enable users to interact with in-vehicle infotainment systems using tactile perception instead of vision and hearing, increasing the ability of drivers to focus on driving and, consequently, decreasing the likelihood of driving accidents.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 4 illustrates how the haptic engine of FIG. 2 configures different surface sections of the haptic controller to mirror different elements of a graphical user interface, according to various embodiments.

DETAILED DESCRIPTION

In the following description, numerous specific details are set forth to provide a more thorough understanding of the present invention. However, it will be apparent to one of skill in the art that the present invention may be practiced without one or more of these specific details.

In-Vehicle Infotainment System

Figure 1A:
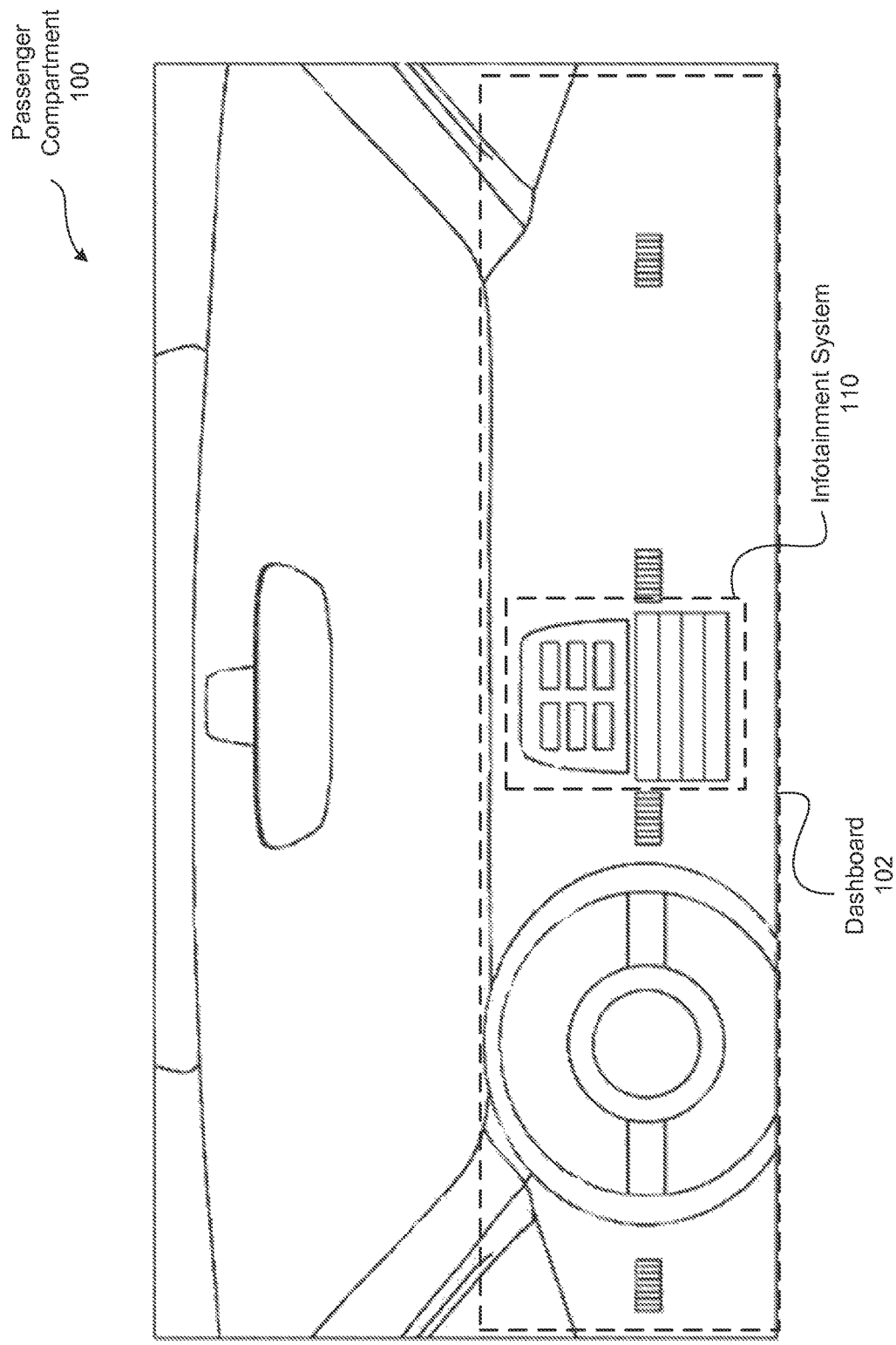
FIG. 1A illustrates a passenger compartment of a vehicle that includes an in-vehicle infotainment system, according to various embodiments.

FIG. 1A illustrates a passenger compartment 100 of a vehicle that includes an in-vehicle infotainment system 110, according to various embodiments. As shown, the passenger compartment 100 includes, without limitation, the infotainment system 110 positioned proximate to a dashboard 102 providing various instrumentation for a driver of a vehicle.

In operation, the infotainment system 110 provides navigation information and other vehicle control information to a driver operating a vehicle. Specifically, for navigation, the infotainment system 110 is configured to accept input from a driver or other person (a "user") including a destination location, to analyze road information, to calculate or determine one or more driving paths for the driver, to display such driving paths overlaid on a map, and to output associated driving instructions to the driver. In yet other embodiments, the infotainment system 110 is configured to display controls to the driver or other user for controlling various equipment and devices within the vehicle. Such equipment and devices may include, without limitation, radio and other audio functions, video functions, movie functions, internet functions, in-vehicle network functions, air conditioner, heater, cellular phone functions, and the like. In some embodiments, without limitation, the infotainment system 110 may also output a variety of information about the car, road conditions, etc, which may be pertinent to the driver.

Although the infotainment system 110 is illustrated as being embedded in and in the center of the dashboard 102, the infotainment system 110 may alternatively be located in other parts of the passenger compartment 100 and/or may be a standalone module. Other variations in location and configuration are possible as well.

Figure 1B:
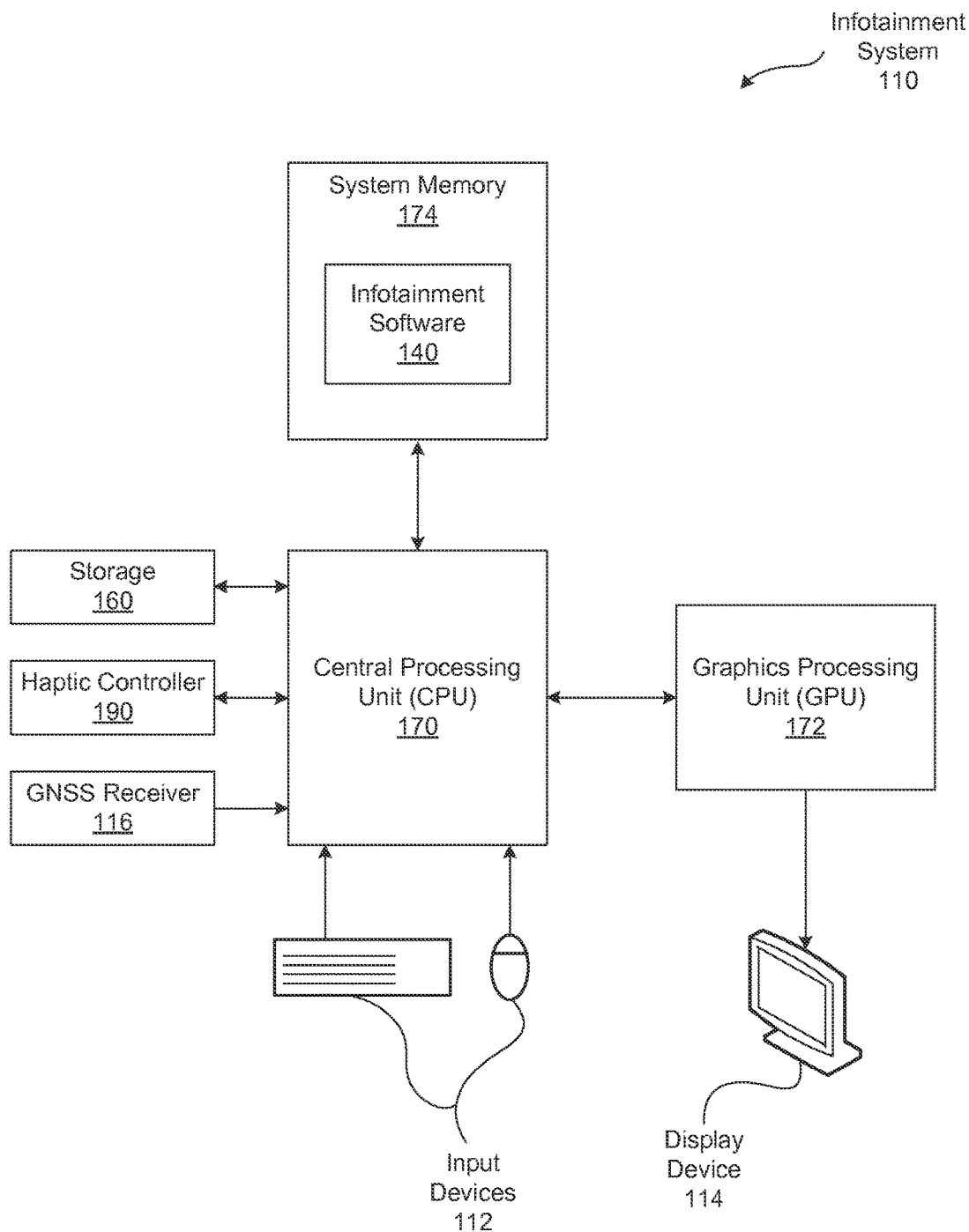
FIG. 1B is a more detailed illustration of the infotainment system of FIG. 1A, according to various embodiments.

FIG. 1B is a more detailed illustration of the infotainment system 110 of FIG. 1A, according to various embodiments. As shown, the infotainment system 110 includes, without limitation, a central processing unit (CPU) 170, a graphics processing unit (GPU) 172, system memory 174, input devices 112, display device 114, storage 160, a global navigation satellite system (GNSS) receiver 116, and a haptic controller 190.

The CPU 170 generally comprises a programmable processor that executes program instructions to manipulate input data. The CPU 170 may include any number of processing cores, memories, and other modules for facilitating program execution. The system memory 174 generally comprises storage chips such as random access memory (RAM) chips that store applications and data for processing by CPU 170.

The system memory 174 stores, among other things, infotainment software 140, which includes, without limitation, software for controlling the different equipment and devices associated with infotainment system 110, such as, and without limitation, the navigation functions and the other equipment and devices described above. The infotainment software 140 also is responsible for performing processing and other functions related to controlling the different equipment and devices associated with the infotainment system 110.

The GPU 172 generally comprises a programmable or fixed function processor that accepts commands and data from the CPU 170 and generates pixels for display on the display device 114. The input devices 112 may include various types of input devices, such as buttons, a microphone, cameras, a touch-based input device integrated with display device 114 (i.e., a touch screen), and other input devices for providing input information to the infotainment system 110 and/or, more specifically, the CPU 170.

In various embodiments, storage 160 includes non-volatile memory such as optical drives, magnetic drives, flash drives, or other storage. The global navigation satellite system (GNSS) receiver 116 determines global position of the vehicle (infotainment system 110, driver, and so on). The GNSS receiver 116 operates based on one or more of the global positioning system of manmade Earth satellites, various electromagnetic spectrum signals (such as cellular tower signals, wireless internet signals, and the like), or other signals or measurements, and/or on a combination of the above items. In various embodiments, the infotainment software 140 accesses global positioning information from GNSS receiver 116 in order to determine a current location of the vehicle.

In operation, the CPU 170 is the master processor of the infotainment system 110, controlling and coordinating operation of other system components. In particular, the CPU 170 receives input via the input devices 112 and/or the haptic controller 190 and executes infotainment software 140, stored in system memory 174, to output navigation and other infotainment-oriented information and controls associated with, for example, and without limitation, the in-vehicle equipment and devices described herein, to the display device 114 and/or the haptic controller 190.

The haptic controller 190 may be any device that stimulates the sense of touch to provide the user with infotainment-related information. Notably, the haptic controller 190 includes one or more configurable touch surfaces that include surface changing mechanisms. In operation, the infotainment software 140 configures the touch surfaces to dynamically create various texture experiences. These texture experiences enable the user to interact with the different equipment and devices associated with infotainment system 110 in an intuitive, non-visual, and non-auditory manner.

By leveraging the sense of touch, the infotainment software 140 "load balances" the human senses during driving—using the touch sense that is typically stimulated less during driving than the sight and sound sense. Consequently, the infotainment software 140 and the haptic controller 190 reduce the cognitive load experienced by the user compared to conventional infotainment systems that rely more heavily on visual and/or auditory interactions with the user. In particular, leveraging the sense of touch via the haptic controller 190 enables the infotainment software 140 to convey the state of the infotainment system 140, such as the input mode and allowable input actions, without requiring the driver to look away from the road.

Configuring the Haptic Controller

Figure 2:
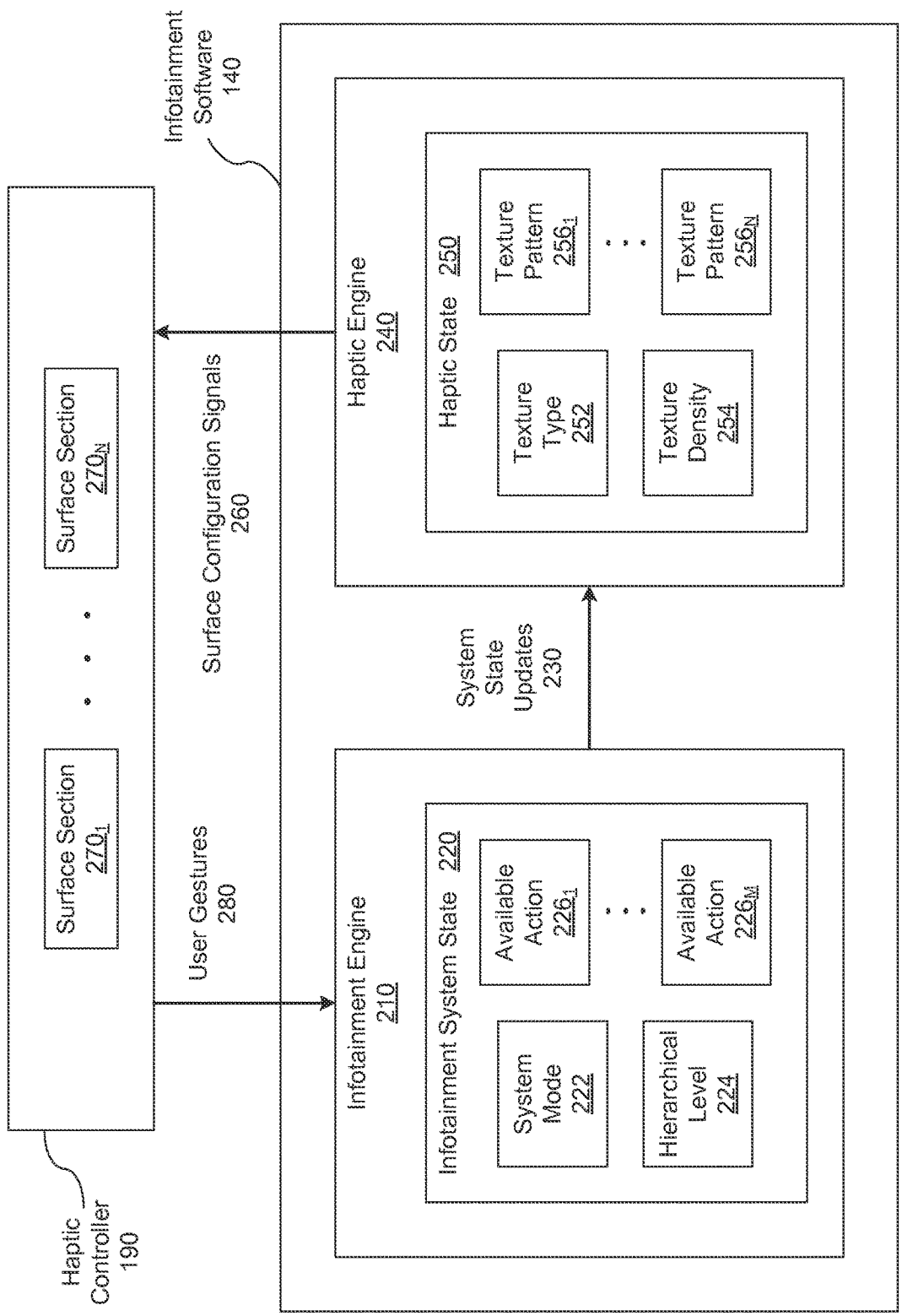
FIG. 2 is a more detailed illustration of the infotainment software of FIG. 1B, according to various embodiments.

FIG. 2 is a more detailed illustration of the infotainment software 140 of FIG. 1B, according to various embodiments. As shown, the infotainment software 140 includes, without limitation, an infotainment engine 210 and a haptic engine 240. In operation, the infotainment engine 210 receives user gestures 280 via any number of surfaces sections 270 included in the haptic controller 190—enabling touch sensitive input. In a complementary fashion, the haptic engine 240 generates surface configuration signals 260 that configure any number of the surface sections 270—using surface-changing as an output communication mechanism.

In some embodiments, without limitation, the infotainment software 140 may support any number of touch sensitive input devices, any number of surface-changing output devices, and any number of touch sensitive and surface-changing input/output devices in addition to or instead of the haptic controller 190. In yet other alternate embodiments, without limitation, the infotainment software 140 may not include support for touch sensing input.

Upon receiving the user gestures 280, the infotainment engine 210 interprets the meaning of the user gestures 280 and then performs corresponding processing and other functions related to controlling the different equipment and devices associated with the infotainment system 110. As part of processing the user gestures 280 in addition to any other relevant input information (i.e., data received via the input devices 112), the infotainment engine 210 updates an infotainment system state 220 that reflects the current operational status of the infotainment system 110. As shown, the infotainment system state 220 includes, without limitation, a system mode 222, a hierarchical level 224, and any number of available actions 226. In alternate embodiments, the infotainment system state 220 may include any amount of information relevant to the operation of the infotainment system 110 or vehicle, organized in any fashion.

The system mode 222 is the current operating mode of the infotainment system 110. For example, and without limitation, the system mode 222 may be one of "main menu," "navigation," "media," and so forth. The hierarchical level 224 is the current level within the system mode 222. For example, and without limitation, the system mode 222 could be music and the hierarchical level could reflect the bottom of a music selection menu tree (e.g., selecting a particular track in a song). The available actions 226 include the acceptable kinds of gesticulated input, such as horizontal swipes, vertical swipes, rotary gestures, and the like.

In general, the infotainment engine 210 may use the system mode 222, the hierarchical level 224, and the available actions 226 independently or in any combination. Notably, in some embodiments, and without limitation, the available actions 226 may convey different meanings depending on the system mode 222. For example, and without limitation, a swipe forward gesture while the infotainment system 110 is in the system mode 222 of "navigation" could convey "panning the map" while the swipe forward gesture while the infotainment system 110 is in the system mode 222 of "media" could convey "next song."

After the infotainment engine 210 changes the infotainment system state 220, the infotainment engine 210 transmits system state updates 230 to the haptic engine 240. The system state updates 230 include modifications to the infotainment system state 220 that are relevant to the haptic engine 240 and, consequently, the configuration of the haptic controller 190. For example and without limitation, the haptic controller 190 could be configured to convey the system mode 222 but not the available actions 226 and, correspondingly, the infotainment engine 210 could be configured to generate the system state updates 230 that include the system mode 222 but not the available actions 226. Further, the infotainment engine 210 could be configured to generate system state updates 230 in response to changes in the system mode 222 but not in response to changes in the available actions 226.

In some embodiments, and without limitation, the system state updates 230 may include information that enables the haptic engine 240 to mirror elements of a graphical user interface that is visually conveyed to the driver via the display device 114. In general, the infotainment engine 210 may be configured to dynamically communicate any amount of information that enables the haptic engine 240 to configure the haptic controller 190 in any manner designed to reduce driver distractions and/or lower the driver cognitive load. Notably, because the haptic engine 240 leverages the sense of touch to "load balance" the human senses (i.e., using a sense that is not already in common use), operating the infotainment system 110 is less likely to interfere with the primary task of driving than operating typical, conventional infotainment systems.

In operation, the haptic engine 240 processes the system state updates 230 to determine texture information designed to intuitively convey relevant aspects of the information system state 220, such as the available actions 226. For example, and without limitation, in some embodiments the haptic engine 240 may map the available actions 226 that involve rotary interaction to textures that include round or curved tactile patterns and may map the available actions 226 that involve sideways (swiping) motions to textures that include rectilinear patterns. In general, the haptic engine 240 maintains the tactile information as a haptic state 250, encoding elements of the infotainment system state 250 as textures with varying layouts, "sharpness," density, orientation, friction coefficients etc.

As shown, the haptic state 250 includes, without limitation, a texture type 252, a texture density 254, and any number of texture patterns 256. In alternate embodiments, the haptic state 250 may include any amount of information relevant to the configuration of the haptic controller 190 organized in any fashion. The texture type 252 is a type of surface features, such as a bump, that reflects the system mode 222. For example, and without limitation, the texture type 252 could be a bump to reflect a system mode 222 of "navigation" or a ridge to reflect a system mode 222 of "music." The texture density 254 is a density of the surface feature that correlates the hierarchical level 224. For example, and without limitation, the texture density 254 could be relatively low to reflect the top of a music menu or relatively high to reflect the bottom of a music menu. Each of the texture patterns 256 is designed to encourage proper entry of one of the available actions 226. For example, and without limitation, the texture pattern 256 could be round or circular to invite the available action 226 of rotary interaction or a rectilinear patter to encourage the available action 225 of scrolling.

As part of updating the haptic state 250, the haptic engine 240 generates the surface configuration signals 260 and then transmits the surface configuration signals 260 to the haptic controller 190. The haptic engine 240 may dynamically generate any number of surface configuration signals 260 at any time. Further, the haptic engine 240 may craft the surface configuration signals 260 to cause any number of the surface sections 270 included in the touch device 190 in any combination to provide textural sensations based on any number of characteristics of the haptic state 250.

Notably, the number of available actions 226, the number of texture patterns 256, and the number of surface sections 270 may or may not match. For example, and without limitation, in some embodiments the haptic controller 190 may include five separately configurable surface sections 270, but the current infotainment system state 230 may only provide one available action 226. In such a scenario, the haptic engine 240 may elect to configure the surface sections 270 to provide the texture pattern 256 corresponding to the available action 226 or the haptic engine 240 may elect to configure only a subset of the surface sections 270 to provide the texture pattern 256.

In various embodiments, the haptic engine 240 may map the infotainment system state 220 to the haptic state 250 in any technically feasible fashion that is consistent with the capabilities of the infotainment system 110, including, and without limitation, the available functions and the texture changing capabilities of the haptic device 190. Similarly, in various embodiments, the haptic engine may generate and transmit the surface configuration signals 260 in any technically feasible fashion that is consistent with the haptic device 190. In general, the number and type of elements include in the infotainment system state 220 and the haptic state 250 reflect processing and equipment capabilities of the infotainment system 110.

The haptic controller 190 may be any type of device that supports at least one dynamically configurable surface texture and may be implemented in any technically feasible fashion. For example, the haptic controller 190 could be included, without limitation, as part of a central control panel, a steering wheel, a gear stick, an arm rest, an entry/exit assist handle, a seat, a head rest, and the like. Further, the haptic controller 190 may be designed to enable the driver to perceive any type of texture-based surface changes in any technically feasible fashion. For example, and without limitation, in some embodiments the haptic controller 190 may allow the haptic engine 240 to variably configure the friction of the surface sections 270 to convey the infotainment system state 220. Alternatively, and without limitation, in a "braille-like" embodiment, the haptic controller 190 may allow the haptic engine 240 to configure the surface sections 270 with different arrangements of ridges and bumps. In "hair/fur" embodiments, without limitation, the haptic controller 190 may allow the haptic engine 240 to configure "hairs" included in carpet-like surface sections 270 to point in various directions. In general, the haptic controller 190 may provide the capability to convey tactile information using braille, hair/fur, variable friction, and/or any other technically feasible mechanism in any combination.

Each of the various surface-changing techniques may be effected in any technically feasible fashion. For example, and without limitation, the variable friction techniques may be implemented using any number of variable friction vibration inducing mechanisms. Notably, by inducing vibrations across the surface sections 270, different levels of friction between the driver's finger and the surface sections 270 can be created to give the driver the perception of touching different tactile surfaces. The haptic controller 190 may include any number of devices that enable these vibrations to be actuated in any technically feasible fashion, such as mechanically, acoustically, electrostatically, etc. In general, the haptic controller 190 may implement surface-changing techniques in any technically feasible fashion using any type of components and/or materials. For example, and without limitation, various texture-changing techniques may be orchestrated using, without limitation, pneumatic bladders, micro-fluidic inflatable bladders, ferro-fluids, shape change materials, and/or techniques inspired by venetian blinds.

Further, the haptic engine 240 and the haptic controller 190 may work together to apply any number of dynamic, texture changing techniques to any number and/or portions of the surface sections 270. For example, and without limitation, in braille-like or hair/fur embodiments, the haptic engine 240 may cause the haptic controller 190 to actuate the surface sections 270 across a larger surface of the haptic controller 190 in an animated fashion, thereby conveying a wave-like effect to the driver.

Figure 3A:
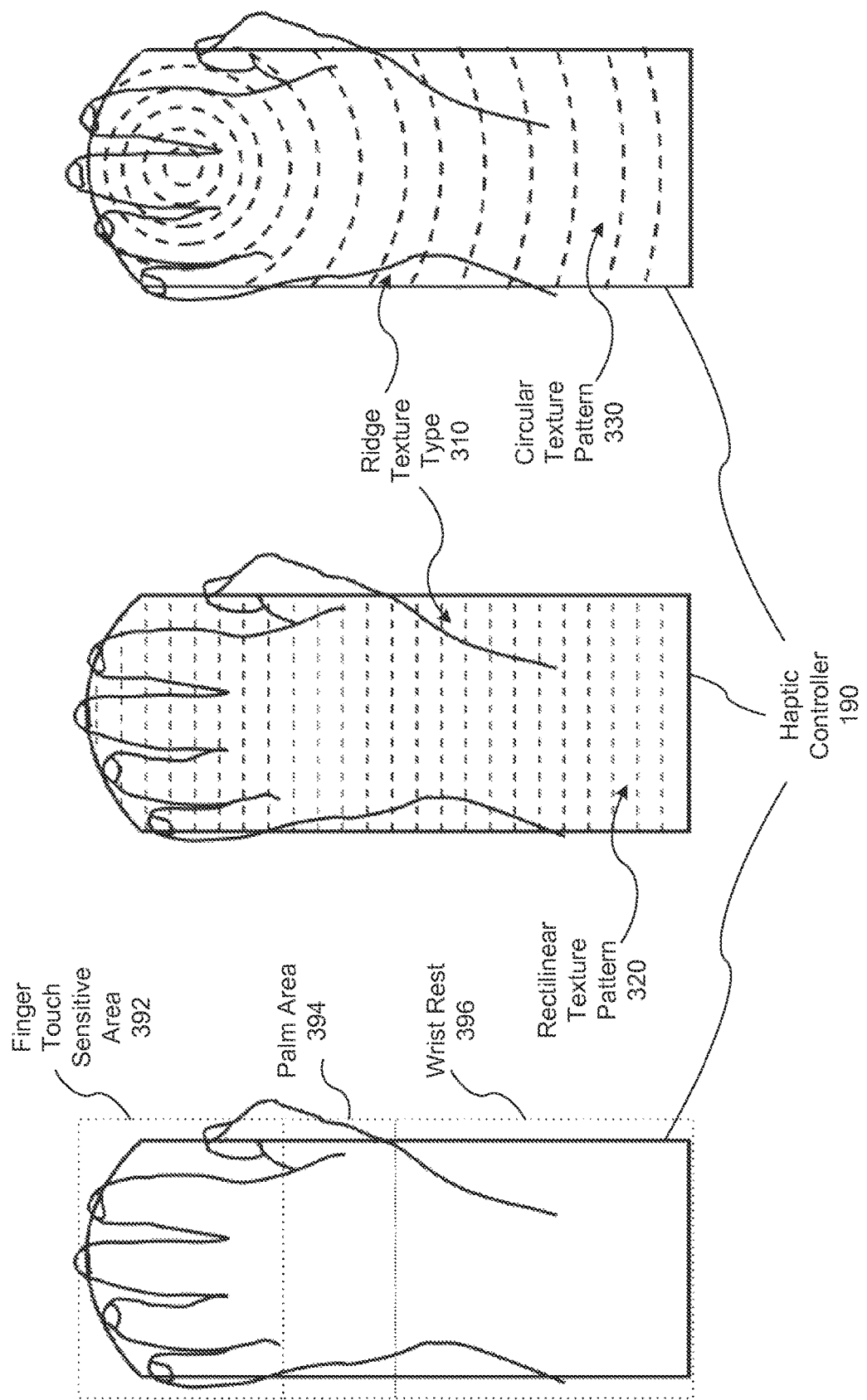
FIG. 3A illustrates how the haptic engine of FIG. 2 configures the haptic controller to express different available actions to a user via ridges, according to various embodiments.

FIG. 3A illustrates how the haptic engine 240 of FIG. 2 configures the haptic controller 190 to express different available actions 226 to a user via ridges, according to various embodiments. More specifically, FIG. 3A depicts snapshots of the haptic controller 190 configured to represent three different infotainment system states 220.

As shown, the haptic controller 190 includes, without limitation, three separate surface sections 270: a finger touch sensitive area 392, a palm area 394, and a wrist rest 396. Notably, the finger touch sensitive area 392 acts as both an input and output device. More specifically, the finger touch sensitive area 392 is configured by the haptic engine 240 via the surface configuration signals 260, and the finger touch sensitive area 392 conveys the user gestures 280 to the infotainment engine 210.

The palm area 394 is a mixed used area and may either act as an output device that provides a resting place for the palm while providing texture-based information based on the surface configuration signals 260, or as both an input and output device. The wrist rest 396 acts as an output device that is configured by the haptic engine 240 to communicate one or more elements of the infotainment system state 220. In general, the surface sections 270 of the haptic controller 190 that operate in an output-only mode provide texture experiences to the user without conveying the corresponding user gestures 280 based on user movements. Further, each of the finger touch sensitive area 392, the palm area 394, and the wrist rest 396 may operate independently or in combination with the other sections.

In the left-most depiction of the haptic controller 190, the haptic engine 240 has not yet configured the haptic controller 190 to provide textural information to the user. In the middle depiction of the haptic controller 190, the haptic engine 240 has configured the finger touch sensitive area 392, the palm area 394, and the wrist rest 396 to express a rectilinear texture pattern 320. More specifically, the texture type 252 is a ridge texture type 310 and the texture pattern 256 is the rectilinear texture pattern 320. In the right-most depiction of the haptic controller 190, the haptic engine 240 has configured the finger touch sensitive area 392, the palm area 394, and the wrist rest 396 to express a circular texture pattern 330. In particular, the texture type 252 is still the ridge texture type 310, however the texture pattern 256 is the circular texture pattern 330. Such a transition in the texture pattern 256 could reflect a change in the available action 226 from a scrolling motion to a rotary motion.

Figure 3B:
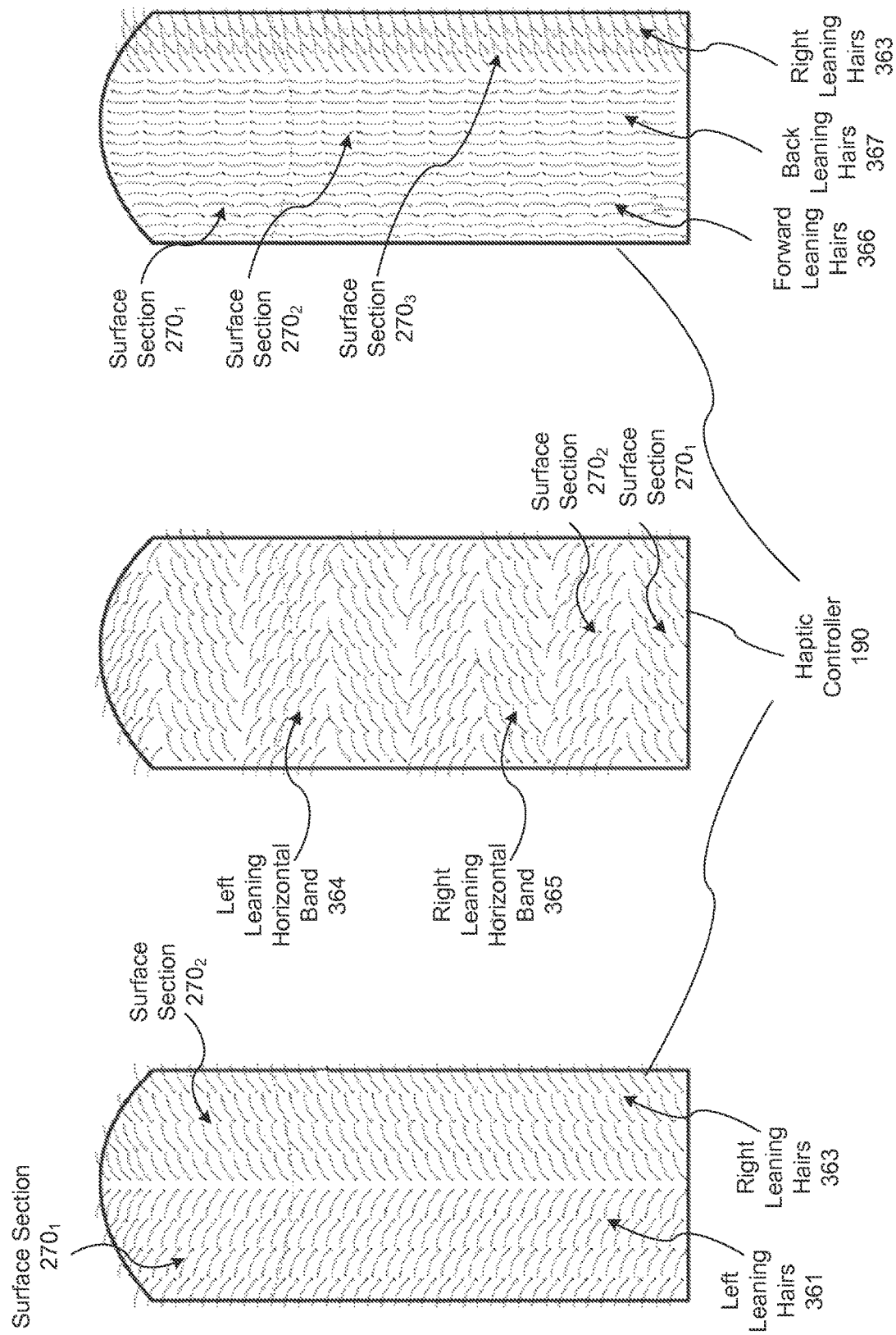
FIG. 3B illustrates how the haptic engine of FIG. 2 configures the haptic controller to express different available actions to a user via hairs, according to various embodiments.

FIG. 3B illustrates how the haptic engine 240 of FIG. 2 configures the haptic controller 190 to express different available actions 226 to a user via hairs, according to various embodiments. In particular, FIG. 3B depicts snapshots of the haptic controller 190 configured to represent three different infotainment system states 220 based on the direction of sections of hairs, bristles, fur, or the like.

In the left-most depiction of the haptic controller 190, the haptic engine 240 has configured the two surface sections 270₁ and 270₂ of the haptic controller 190 to define two separate interaction areas. As shown, the haptic engine 240 has configured the left surface section 270₁ to express left leaning hairs 361 and the right surface section 270₂ to express right leaning hairs 363.

By contrast, in the middle depiction of the haptic control 190, the haptic engine 240 has configured the multiple surface sections 270 of the haptic controller 190 to define interaction areas that represent alternating available actions. As shown, the haptic engine 240 has configured the bottom surface section 270₁ to express a right leaning horizontal band 365 of hairs, and the adjacent surface section 270₂ to express a left leaning horizontal band 364 of hairs.

In the right-most depiction of the haptic controller 190, the haptic engine 240 has configured the three surface sections 270₁, 270₂, and 270₃ of the haptic controller 190 to define three separate interaction areas. The haptic engine 240 has configured the left surface section 270₁ to express forward leaning hairs 366, the middle surface section 270₂ to express back leaning hairs 367, and the right surface section 270₃ to express the right leaning hairs 363.

In various embodiments, hair/fur techniques may be implemented using, without limitation, static hairs on a dynamic surface that actuates to reorient the hairs; hairs that are individually attached to magnets; hairs composed of a shape change material and actuated through electric, heat, or magnetic changes; and/or hairs manufactured of a magnetic material. In the magnetic hair embodiment, the magnetic hairs may be actuated using strategically placed electromagnets and the haptic engine 240 may configure parameters associated with the electromagnetics via the surface configuration signals 260 to control the direction of the hairs.

Figure 3C:
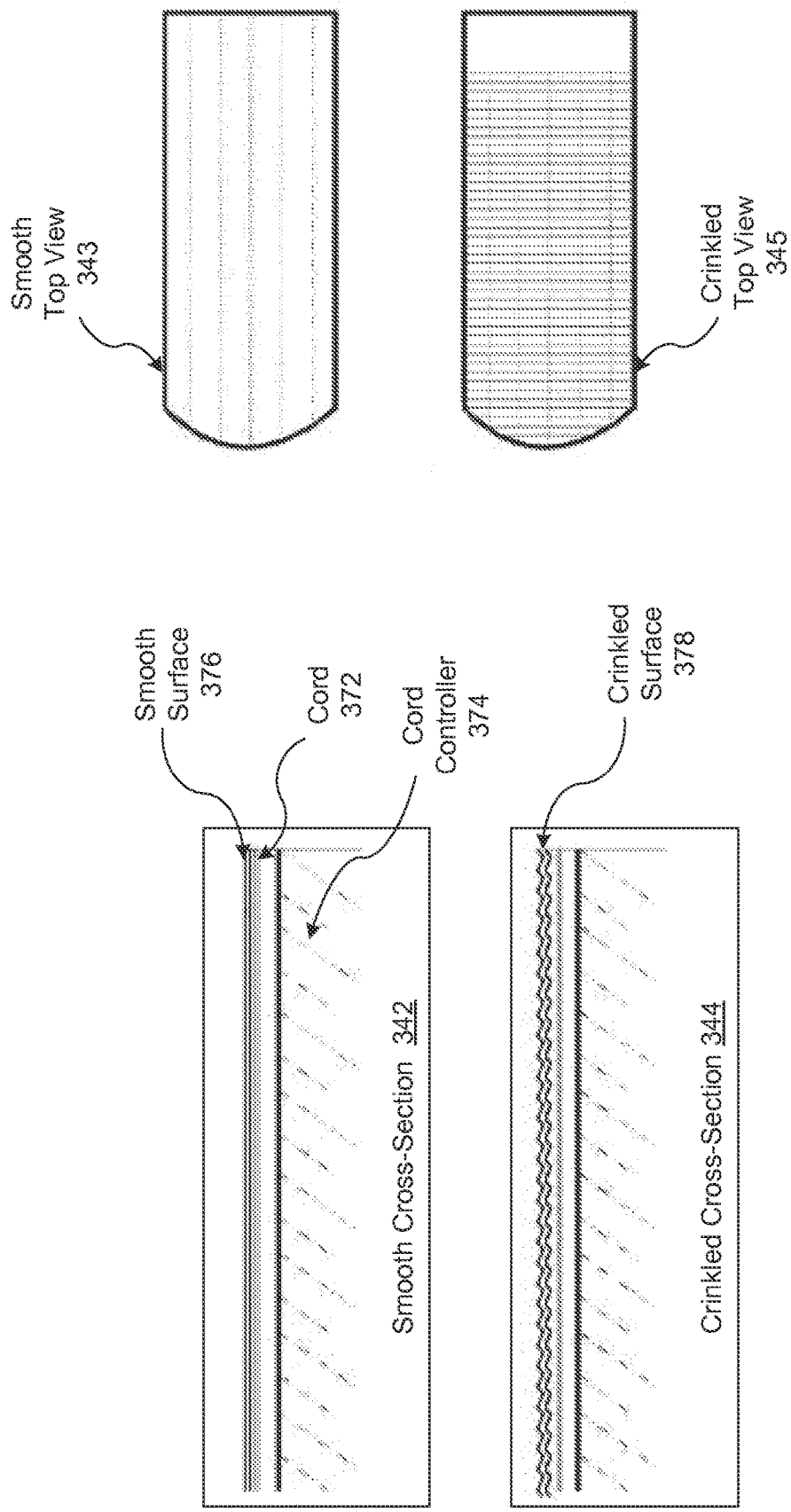
FIG. 3C illustrates how the haptic engine of FIG. 2 configures the haptic controller to express different available actions to a user via surface roughness, according to various embodiments.

FIG. 3C illustrates how the haptic engine 240 of FIG. 2 configures the haptic controller 190 to express different available actions 226 to a user via surface roughness, according to another embodiment. For descriptive purposes, FIG. 3C depicts cross-section/top views of the haptic controller 190 configured in a venetian blind inspired manner to represent two different infotainment system states 220.

As shown, the haptic controller 190 includes, without limitation, a cord controller 374 and cords 372. In operation, the haptic engine 240 configures the cord controller 374 to dynamically vary the length of the cords 372 included in the surface sections 270, causing the texture of the surface sections 270 to change. As the length of a particular cord 372 decreases, the roughness of the associated surface section 270 increases—crinkling, buckling, or the like. Consequently, in such an embodiment, the haptic engine 240 may configure the length of the cords 372 via the surface configuration signals 260 to encode elements of the infotainment system state 220 as surface roughness.

Both a smooth cross-section 342 and a smooth top view 343 depict a smooth surface 376 that corresponds to a relatively long length of the cord 372. By contrast, both a crinkled cross-section 344 and a crinkled top view 345 depict a crinkled surface 378 that corresponds to a relatively short length of the cord 372.

Figure 3D:
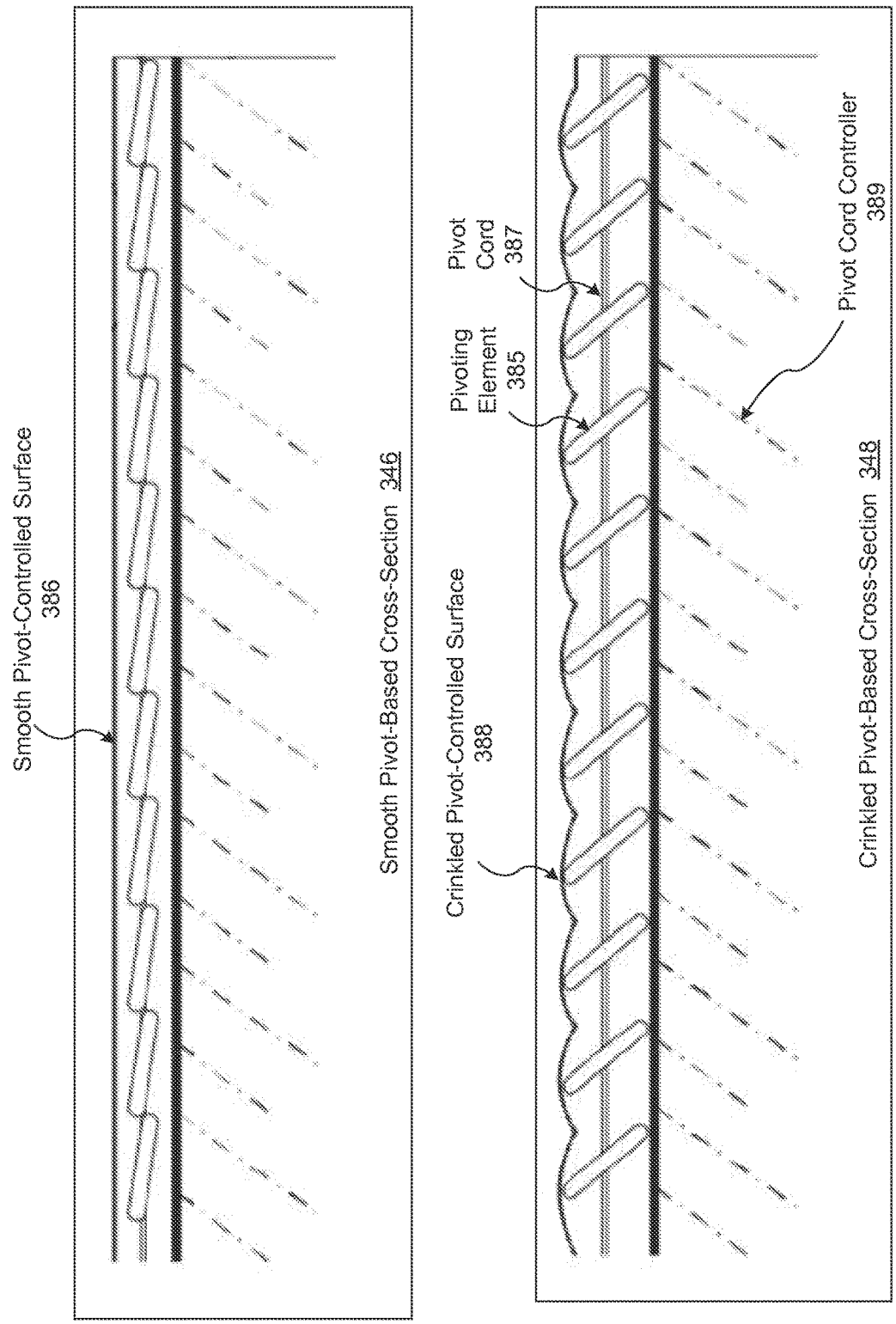
FIG. 3D illustrates how the haptic engine of FIG. 2 configures the haptic controller to express different available actions to a user via pivot-controlled surface roughness, according to various embodiments.

FIG. 3D depicts snapshots of the haptic controller 190 configured to represent two different infotainment system states 220 via pivot-controlled surface roughness, according to another embodiment. More specifically, FIG. 3D depicts cross-section views of the haptic controller 190 configured in a venetian blind inspired manner to represent two different infotainment system states 220 using pivoting elements.

In the pivot-controlled embodiment depicted in FIG. 3D, the haptic controller 190 includes, without limitation, pivot cords 387, a pivot cord controller 389, and pivoting elements 385. In operation, the haptic controller 190 directs the movement of each of the pivot cords 387 via the pivot cord controller 389. As a particular pivot cord 387 moves, one or more attached pivot elements 385 rotate, thereby causing the associated surface section(s) 270 to exhibit different textural pattern. Consequently, in such an embodiment, the haptic engine 240 may direct the movement of the pivot cords 387 via the surface configuration signals 260 to encode elements of the infotainment system state 220 as patterns of surface roughness.

A smooth pivot-based cross-section 346 depicts a horizontal, smooth pivot-controlled surface 386 that corresponds to a relatively horizontal (i.e., flat) orientation of the pivoting elements 385. By contrast, a crinkled pivot-based cross-section 348 depicts a horizontal, crinkled pivot-controlled surface 388 that corresponds to a relatively vertical configuration of the pivoting elements 385.

FIG. 4 illustrates how the haptic engine 240 of FIG. 2 configures different surface sections 270 of the haptic controller 190 to mirror different elements of a graphical user interface (GUI), according to various embodiments. FIG. 4 depicts the surface of the haptic controller 190 at two states: before and after the user performs a swiping motion user gesture 280.

As shown in the left depiction of the haptic controller 190, the haptic engine 240 has configured the three surface sections 270 of the haptic controller 190 to mirror three separate interaction areas included in the GUI displayed via the display device 114. The haptic engine 240 has configured the surface section 270₁ to express vertical ridges 420 that reflect a vertical scroll menu included in the GUI. The haptic engine 240 has configured the surface section 270₂ to express circular ridges 430 that reflect a circular scroll selector included in the GUI. The haptic engine 240 has configured the surface section 270₃ to express round bumps 440 that reflect the ability to "swipe" the GUI to a full-screen mode.

After the user has performed a swiping motion user gesture 280 across the surface section 270₃, the infotainment engine 210 processes the user gesture 280 and updates the infotainment system state 220. Subsequently, the infotainment engine 210 relays the system state updates 230 to both a GUI engine and to the haptic engine 240. The GUI engine receives the system state updates 230, modifies visual state data based on the system state updates 230, and then updates the GUI displayed on the display device 114 to reflect the new visual state data. Similarly, the haptic engine 240 receives the system state updates 230, modifies the haptic state 250 based on the system state updates 230, and then generates and transmits the surface configuration signals 260 to the haptic controller 190 for textural expression. In this fashion, the infotainment engine 210, the GUI engine, and the haptic engine 240 work together to ensure that the information conveyed by the display device 114 and the haptic controller 190 are in-sync.

As shown in the right depiction of the haptic controller 190, in response to the surface configuration signals 260, the three surface sections 270 of the haptic controller 190 express two separate interaction areas. The haptic engine 240 has configured the surface section 270₁ to express the round bumps 440, reflecting the ability to "swipe" the GUI out of the full-screen mode. The haptic engine 240 has configured the remaining two surface areas 270₂ and 270₃ to express low density horizontal ridges 450, reflecting a relatively high value for the hierarchical level 224 and the relatively wide range of the user gestures 280 that may be performed in the full-screen mode.

Figure 5:
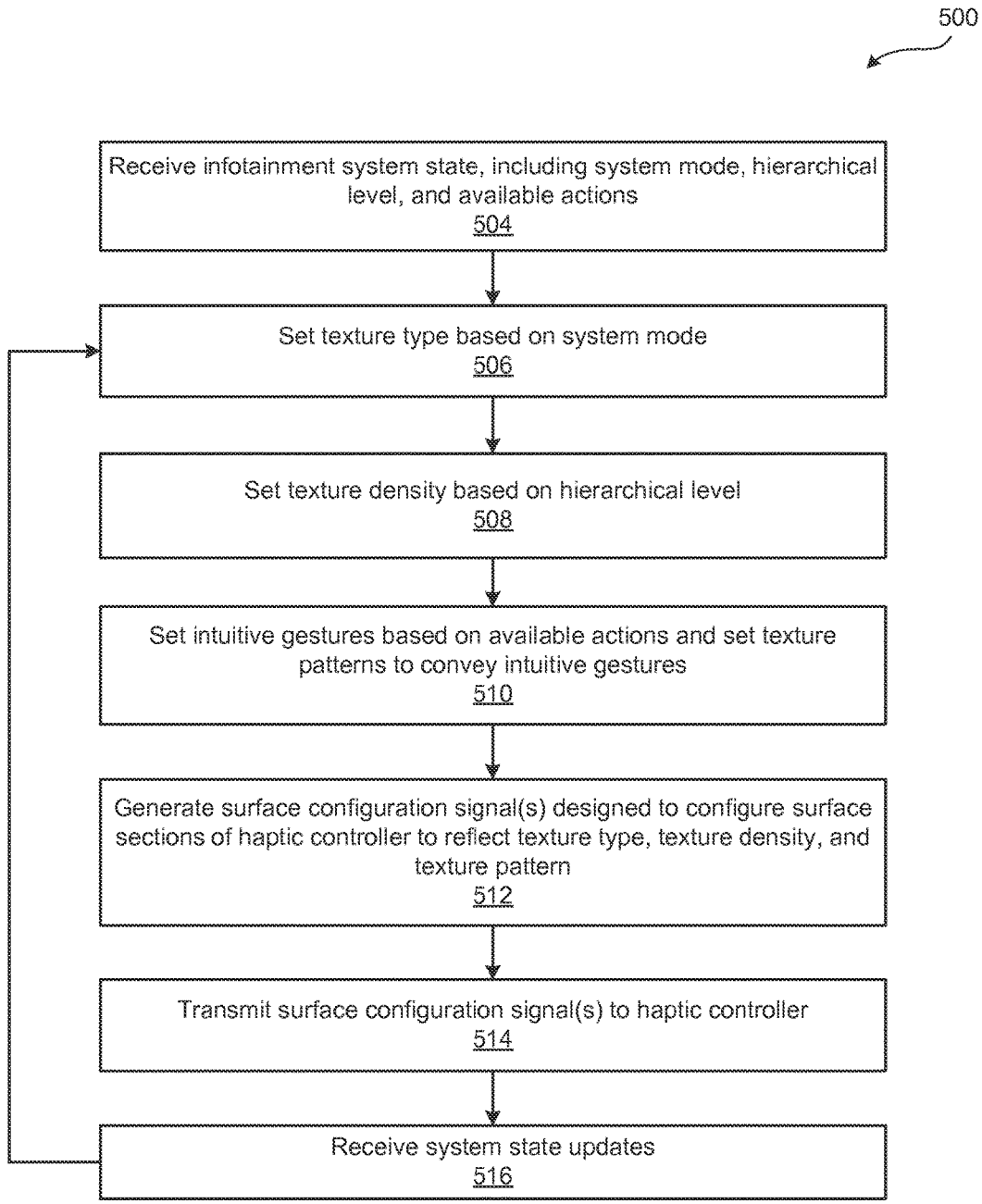
FIG. 5 is a flow diagram of method steps for conveying information related to one or more states associated with an infotainment system to a user, according to various embodiments.

FIG. 5 is a flow diagram of method steps for conveying information related to one or more states associated with an infotainment system to a user, according to various embodiments. Although the method steps are described in conjunction with the systems of FIGS. 1-4, persons skilled in the art will understand that any system configured to implement the method steps, in any order, falls within the scope of the present invention. The context of FIG. 5 is that the infotainment system 110 includes the haptic controller 190 and the haptic controller 190 includes one or more dynamically configurable surface sections 270.

As shown, a method 500 begins at step 504, where the haptic engine 240 receives the infotainment system state 220, including, without limitation, the system mode 222, the hierarchical level 224, and the available actions 226. In alternate embodiments, the infotainment system state 220 may include any number of system modes 222, any number of hierarchical levels 224, and any number of available actions 226, enabling the haptic engine to individually configure multiple surface sections 270 included in the haptic controller 160.

At step 506, the haptic engine 240 sets the texture type 252 based on the system mode 222. Similarly, at step 508, the haptic engine 240 sets the texture density 254 based on the hierarchical level 224. At step 510, for each of the available actions 226, the haptic engine 240 selects an intuitive gesture based on the available action 226 and then sets the texture pattern 256 to guide the user to employ the intuitive gesture.

At step 512, the haptic engine 240 generates the surface configuration signal(s) 260 designed to configure the surface sections 270 of the haptic controller 190 to reflect the texture type 252, the texture density 254, and the texture patterns 256. At step 514, the haptic engine 240 transmits the surface configuration signal(s) 260 to the haptic controller 190. At step 516, the haptic engine 240 receives the system state updates 230 from the infotainment engine 210, and the method 500 returns to step 506 where the haptic engine 240 reconfigures the haptic controller 190 to convey the state changes to the user in a textural manner. The haptic controller 190 continues in this fashion, performing steps 506-516 to dynamically configure the haptic controller 190 to convey the current infotainment system state 220 in a non-visual, non-auditory, intuitive manner that subconsciously prompts the user to perform the appropriate user gestures 280.

In sum, the disclosed techniques enable intuitive, relatively low cognitive load interfaces to interactive systems. Notably, an infotainment system includes a haptic engine that configures surfaces of a haptic controller to provide textural sensations that convey pertinent information regarding system state. In operation, an infotainment engine maintains a system state that includes, without limitation, the current system mode, the current hierarchical level in the system mode, and user actions that are currently supported by the infotainment system. The haptic engine sagaciously translates the current system mode into a texture type, the hierarchical level into a texture density, and the available actions into texture patterns. In general, for each available action, the haptic engine selects a combination of texture type, texture density, and texture pattern that induces the user to instinctively perform the correct action (e.g., selecting a curved tactile pattern to invite rotary interaction). Subsequently, the haptic engine generates and transmits signals to the haptic controller that, when received by the haptic controller, configure the surfaces included in the haptic controller to convey sensations corresponding to the texture type, density, and patterns.

At least one advantage of the disclosed approaches is that they reduce cognitive load compared to many conventional interactive systems by "load balancing" the human senses. More specifically, many common tasks, such as driving, rely heavily on the senses of sight and sound, but are less reliant on the sense of touch that is exploited by the haptic engine. Notably, because the haptic engine can use texture to convey information regarding the state of an infotainment system and acceptable interactive gestures, the user can configure the infotainment system while remaining focused on driving. In particular, the user can interact with the infotainment system without taking their eyes off the road, thereby reducing the likelihood of car accidents attributable to distracted driving.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The invention has been described above with reference to specific embodiments. Persons of ordinary skill in the art, however, will understand that various modifications and changes may be made thereto without departing from the broader spirit and scope of the invention as set forth in the appended claims. For example, and without limitation, although many of the descriptions herein refer to specific types of audio-visual equipment and sensors, persons skilled in the art will appreciate that the systems and techniques described herein are applicable to other types of performance output devices (e.g., lasers, fog machines, etc.) and sensors. The foregoing description and drawings are, accordingly, to be regarded in an illustrative rather than a restrictive sense.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for conveying information related to one or more states associated with an interactive system, the method comprising:
   determining a first texture density based on a first hierarchical level associated with the interactive system;
   causing a haptic controller to alter one or more first physical characteristics of a first surface to provide a first tactile sensation corresponding to the first texture density;
   determining a second texture density based on a second hierarchical level associated with the interactive system; and
   causing the haptic controller to alter one or more second physical characteristics of the first surface to provide a second tactile sensation corresponding to the second texture density.

2. The method of claim 1, wherein the first texture density is determined based on a first state that includes at least one of a system mode, the first hierarchical level, and an available action.

3. The method of claim 2, wherein the first state includes an available action, determining the first texture density comprises determining an available gesture based on the available action, and causing the haptic controller to alter one or more first physical characteristics of the first surface further causes the haptic controller to configure the first surface to receive input via the available gesture.

4. The method of claim 1, wherein a first texture characteristic corresponding to the first texture density comprises a shape or pattern.

5. The method of claim 1, further comprising detecting a tactile input via the first surface and generating a second state corresponding to the second hierarchical level based on the tactile input.

6. The method of claim 1, further comprising detecting a tactile input via a second surface and generating a second state corresponding to the second hierarchical level based on the tactile input.

7. The method of claim 1, further comprising:
   determining a third texture characteristic based on the second hierarchical level; and
   causing the haptic controller to alter one or more physical characteristics of a second surface to provide a third tactile sensation corresponding to the third texture characteristic.

8. The method of claim 1, further comprising determining a visual signal based on the second hierarchical level and transmitting the visual signal to a display device.

9. The method of claim 1, further comprising:
   determining a first texture type based on a first mode associated with the interactive system, wherein the first hierarchical level is associated with the first mode, and the first tactile sensation further corresponds to the first texture type; and
   determining a second texture type based on a second mode associated with the interactive system, wherein the second hierarchical level is associated with the second mode, and the second tactile sensation further corresponds to the second texture type.

10. The method of claim 1, wherein the first hierarchical level and the second hierarchical level are different hierarchical levels of a first mode of the interactive system.

11. A non-transitory, computer-readable storage medium including instructions that, when executed by a processor, cause the processor to convey information related to one or more states associated with an interactive system by performing the steps of:
   determining a first texture density based on a first hierarchical level associated with the interactive system;
   causing a haptic controller to alter one or more first physical characteristics of a first surface to provide a first tactile sensation corresponding to the first texture density;
   detecting a transition from a first hierarchical level to a second hierarchical level associated with the interactive system;
   determining a second texture density based on the second hierarchical level; and causing the haptic controller to alter one or more second physical characteristics of the first surface to provide a second tactile sensation corresponding to the second texture density.

12. The non-transitory, computer-readable storage medium of claim 11, wherein the first texture density is determined based on a first state that includes at least one of a system mode, the first hierarchical level, and an available action.

13. The non-transitory, computer-readable storage medium of claim 12, wherein the first state includes a rotary action and a first texture characteristic corresponding to the first texture density comprises a circular pattern.

14. The non-transitory, computer-readable storage medium of claim 11, wherein a first texture characteristic corresponding to the first texture density comprises a shape or pattern.

15. The non-transitory, computer-readable storage medium of claim 11, further comprising detecting a tactile input via the first surface and generating a second state corresponding to the second hierarchical level based on the tactile input.

16. The non-transitory, computer-readable storage medium of claim 11, further comprising detecting a tactile input via a second surface and generating a second state corresponding to the second hierarchical level based on the tactile input.

17. The non-transitory, computer-readable storage medium of claim 11, wherein a first texture characteristic corresponding to the first texture density comprises a surface roughness, the first surface includes a dynamically configurable cord, and altering the one or more first physical characteristics of the first surface comprises setting a length of the dynamically configurable cord based on the surface roughness.

18. The non-transitory, computer-readable storage medium of claim 11, wherein a first texture characteristic corresponding to the first texture density comprises a direction, the first surface includes a magnetic filament hair, and altering the one or more first physical characteristics of the first surface comprises setting a parameter associated with an electromagnetic device for altering a direction of the magnetic filament hair based on the direction.

19. The non-transitory, computer-readable storage medium of claim 11, further comprising:
determining a third texture characteristic based on the second hierarchical level; and
causing the haptic controller to alter one or more physical characteristics of a second surface to provide a third tactile sensation corresponding to the third texture characteristic.

20. The non-transitory, computer-readable storage medium of claim 11, further comprising determining a visual signal based on the second hierarchical level and transmitting the visual signal to a display device.

21. A subsystem for conveying information related to one or more states associated with an interactive system, the subsystem comprising:
a memory that includes a haptic engine; and
a processor coupled to the memory and, upon executing the haptic engine, is configured to:
determine a first texture density based on a first hierarchical level associated with the interactive system,
cause a haptic controller to alter one or more first physical characteristics of a first surface to provide a first tactile sensation corresponding to the first texture density,
determine a second texture density based on a second hierarchical level associated with the interactive system, and
cause the haptic controller to alter one or more second physical characteristics of the first surface to provide a second tactile sensation corresponding to the second texture density.

22. The subsystem of claim 21, wherein the first texture density is determined based on a first state that includes at least one of a system mode, the first hierarchical level, and an available action, and a first texture characteristic corresponding to the first texture density comprises a shape or pattern.

* * * * *